United States Patent
Fink et al.

(10) Patent No.: US 8,255,114 B2
(45) Date of Patent: Aug. 28, 2012

(54) METHOD AND MEASURING SYSTEM FOR DETERMINING A WHEEL LOAD

(75) Inventors: Alexander Fink, Regensburg (DE);
Thomas Haas, Donaustauf (DE);
Gregor Kuchler, Regensburg (DE)

(73) Assignee: Continental Automotive GmbH,
Hannover (DE)

( * ) Notice: Subject to any disclaimer, the term of this patent is extended or adjusted under 35 U.S.C. 154(b) by 535 days.

(21) Appl. No.: 12/555,427

(22) Filed: Sep. 8, 2009

(65) Prior Publication Data

US 2010/0063671 A1    Mar. 11, 2010

(30) Foreign Application Priority Data

Sep. 8, 2008 (DE) .................. 10 2008 046 269

(51) Int. Cl.
*G01L 5/00* (2006.01)
*G01M 17/02* (2006.01)
(52) U.S. Cl. .................. 701/33.7; 701/32.9; 73/146
(58) Field of Classification Search .................. None
See application file for complete search history.

(56) References Cited

U.S. PATENT DOCUMENTS

| | | | | |
|---|---|---|---|---|
| 5,913,240 | A * | 6/1999 | Drahne et al. | 73/146 |
| 6,539,295 | B1 * | 3/2003 | Katzen et al. | 701/33.6 |
| 6,550,320 | B1 * | 4/2003 | Giustino | 73/146 |
| 6,851,307 | B2 * | 2/2005 | Poulbot | 73/146 |
| 7,472,587 | B1 * | 1/2009 | Loehndorf et al. | 73/146 |
| 2007/0240502 | A1 * | 10/2007 | Morinaga et al. | 73/146 |
| 2008/0053582 | A1 * | 3/2008 | Shimura | 152/152.1 |
| 2008/0245459 | A1 * | 10/2008 | Miyoshi | 152/450 |

FOREIGN PATENT DOCUMENTS

| | | |
|---|---|---|
| DE | 101 46 031 A1 | 4/2003 |
| DE | 10 2005 048 794 A1 | 4/2007 |
| DE | 10 2006 033 951 A1 | 10/2007 |

* cited by examiner

*Primary Examiner* — Michael J. Zanelli
(74) *Attorney, Agent, or Firm* — Laurence A. Greenberg; Werner H. Stemer; Ralph E. Locher

(57) ABSTRACT

A method and a measuring system determine a wheel load. These involve measuring a deformation of a tire and using a set of equations and equation parameters to calculate from the deformation the wheel load acting on the tire. In addition, a wheel load or a variable dependent on the load, which is used to calculate the wheel load, is received from an external system. Finally, the two wheel loads determined in different ways are compared, and the equations and/or equation parameters are adapted on the basis of the comparison.

16 Claims, 2 Drawing Sheets

FIG. 1A
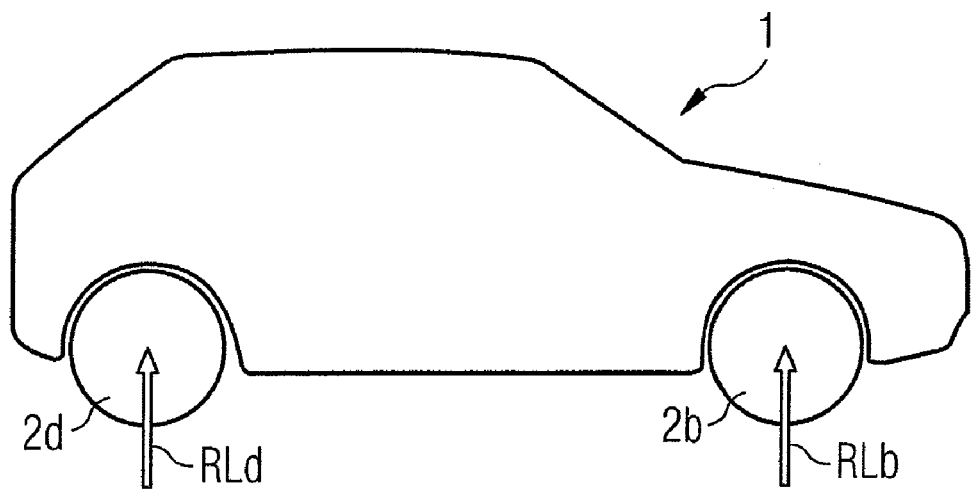
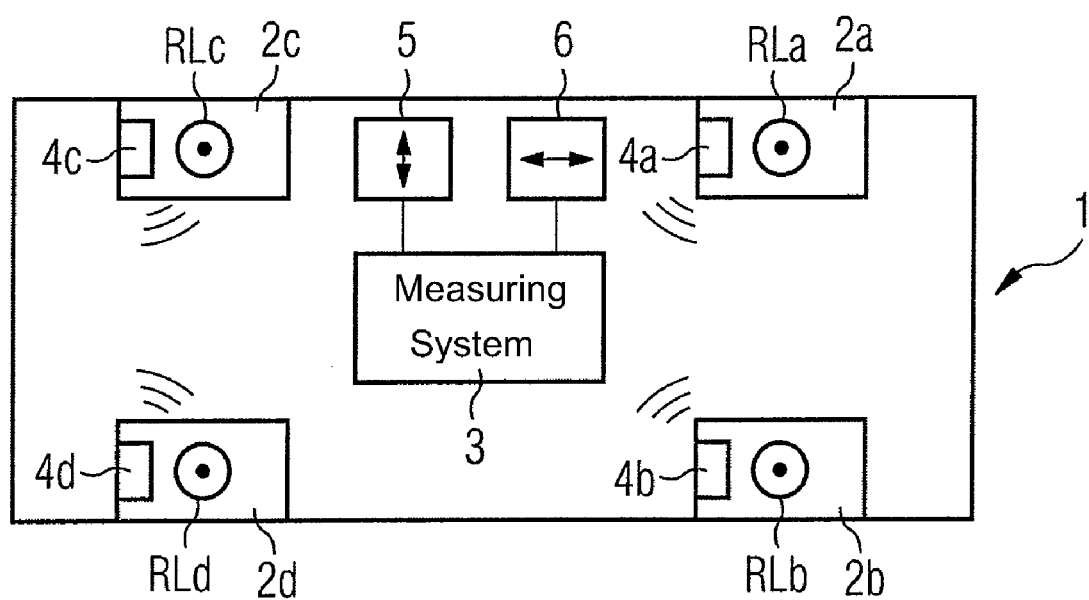
FIG. 1B

METHOD AND MEASURING SYSTEM FOR DETERMINING A WHEEL LOAD

CROSS-REFERENCE TO RELATED APPLICATION

This application claims the priority, under 35 U.S.C. §119, of German application DE 10 2008 046 269.1, filed Sep. 8, 2008; the prior application is herewith incorporated by reference in its entirety.

BACKGROUND OF THE INVENTION

Field of the Invention

The invention relates to a method for determining a wheel load. The invention also relates to a measuring system for determining the wheel load.

Modern vehicles contain a wealth of information systems that provide the driver with information about his/her vehicle. Some of the information is used merely for informing the driver, but some is also used as a warning. One of these systems is a tire information system or else a tire-pressure monitoring system, which not only monitors the tire pressure, as the name suggests, but nowadays is also able to determine a wheel load acting on a wheel. The measured wheel load can be used, for example, to specify the setpoint value for a suitable tire pressure that depends on the vehicle load. In addition, however, the wheel load can also be supplied to other vehicle systems, for example systems for improving driving comfort, safety systems and vehicle stability control systems.

The wheel load is just one of numerous parameters that affect the size and length of the wheel footprint, i.e. the contact area between tire and ground. Other examples are tire pressure, tire temperature, elasticity of the rubber compound used for the tire, the age and ageing conditions of the tire, tire type, tire model, tire size etc. A major problem in determining the wheel load is that these parameters vary widely. In conventional systems, however, just one algorithm containing specific, mostly constant parameters is usually used to calculate the wheel load. Consequently, in the existing systems, the equations and parameter sets are tailored to suit the individual tires. The disadvantage with this is that it requires extensive and laborious analysis of individual tires or tire types to determine a suitable calculation algorithm or a suitable parameters set. Despite every care, mathematical models found in this manner often provide only inadequate results, in particular when the actual ambient conditions do not match those under which a tire was analyzed. Hence conventional measurement systems often produce severely distorted results. Measurements distorted in this way can constitute a significant safety risk, in particular when they are used, for example, for a vehicle stability control system and can cause unstable vehicle conditions in this way.

SUMMARY OF THE INVENTION

It is accordingly an object of the invention to provide a method and a measuring system for determining a wheel load that overcome the above-mentioned disadvantages of the prior art methods and devices of this general type, which enable the wheel load to be determined more accurately.

It is accordingly provided to perform the following steps in a method according to the invention for determining the wheel load:
a) receiving a measurement of a deformation of a tire;
b) calculating the wheel load acting on the tire using the measured deformation and a set of equations and equation parameters;
c) receiving from an external system the wheel load or a variable dependent on this load, which is used to calculate the wheel load;
d) comparing the wheel load determined in step b) with the wheel load determined in step c); and
e) adapting the equations and/or equation parameters on the basis of this comparison.

In order to achieve the inventive object, a measuring system for determining the wheel load is also proposed. The measuring system contains:
a) a device for receiving a measurement of a deformation of a tire;
b) a device for calculating the wheel load acting on the tire using the measured deformation and a set of equations and equation parameters;
c) a device for receiving from an external system the wheel load or a variable dependent on this load, which is used to calculate the wheel load;
d) a device for comparing the wheel load that was determined using the device cited in step b) with the wheel load that was determined using the device cited in step c); and
e) a device for adapting the equations and/or equation parameters on the basis of the comparison.

Using the method according to the invention or respectively the measuring system according to the invention, it is now possible over a period of time, i.e. after one or more adaptation cycles, to determine relatively accurately the wheel loads acting on a wheel or on a tire fitted on the wheel. A safety risk for vehicle and occupants mentioned in the introduction can thereby at least be significantly reduced if not avoided. Advantageously, existing wheel-load measuring systems can be upgraded and still used.

It is advantageous if one or more variables from the following group is provided as a variable dependent on the wheel load: control variables of an active shock-absorber system, suspension compression of a passive shock-absorber system, longitudinal acceleration, transverse acceleration, wheel load of a wheel fitted on the same axle, total vehicle weight and position of center of gravity, braking data, vehicle speed and/or steering angle. In theory, a wheel load can be determined from this data, something that is relatively easy when there is an active or passive shock absorber assigned to the wheel. It is also very easy to determine a wheel load, however, when the vehicle weight and position of the center of gravity are known. If the longitudinal acceleration and transverse acceleration are also available, the wheel load can also be determined in other, dynamic operating states. The same applies to the vehicle speed and/or the steering-wheel angle. This data is often already available in the in-vehicle electronics and can serve a double purpose using the invention.

It is advantageous if, in an initial step, equations and/or equation parameters stored in a transponder are retrieved, the transponder being fitted in or on the tire, or if, in an initial step, data stored in a transponder is retrieved, the transponder being fitted in or on the tire, and the equations and/or equation parameters are determined from the retrieved data.

The equations and/or equation parameters can be adapted particularly quickly when the adaptation starts from a favorable starting point. For this purpose, the equations and/or equation parameters can be stored by the tire manufacturer in a transponder mounted on a tire, and then retrieved for the method according to the invention. Alternatively, however, it is also possible that the equations and/or equation parameters are determined from data that has been stored by the tire manufacturer in a transponder. For example, this data may be tire type (winter/summer/all-season tire, run-flat tire, type of run-flat tire, design, unidirectional tire, symmetry), tire make, tire size and tire dimension, rubber compound, tire stiffness values, speed rating, load index and date of tire manufacture (DOT). Of course the transponder and wheel sensor can also be housed in a shared enclosure.

It is also advantageous, if, in an initial step, the equations and/or the equation parameters, which are stored in a remote database and assigned to the tire or tire type, are retrieved, or if, in an initial step, data stored in a remote database and assigned to the tire or tire type is retrieved, and the equations and/or the equation parameters are determined from the retrieved data.

What has already been stated for the transponder also applies here. The difference is that the data is stored centrally, so for instance in a database of the tire manufacturer or vehicle manufacturer.

It is advantageous if the equations and/or the equation parameters are transmitted to a remote database. If improved equations and/or equation parameters, i.e. equations and/or equation parameters that have passed through one or more adaptation steps, are transmitted to a central database of, for example, the tire manufacturer or vehicle manufacturer, then this improved data can also be made available to other vehicle owners. By these measures, however, the tire manufacturer, for instance, can also receive a large amount of data that provides information about their products.

It is also advantageous if the equations and/or the equation parameters are retrieved in an initial step from another tire of the same type fitted on the same vehicle. It is often not possible to access data stored in a transponder or a database. In order to achieve a favorable starting point nonetheless for adapting the equations and/or equation parameters, the data can be retrieved from another tire of the same type fitted on the same vehicle and advantageously already fitted for a prolonged period. In this case, the data is advantageously retrieved from tires that are fitted on the same axle. This is likely to give an even better match between the mathematical model and reality.

It is also particularly advantageous if the equations and/or equation parameters are stored before removing a tire or the wheel on which the tire is fitted, and if the equations and/or equation parameters are retrieved again in an initial step after fitting the tire or the wheel on which the tire is fitted.

Wheels for automobiles are usually changed every six months, in the spring and autumn. In order to be able to access a reliable set of equations and/or equation parameters when the same wheel is re-fitted on the same vehicle, this data is stored before wheel removal and retrieved again after wheel fitting. This data can be stored in a transponder mounted in or on a tire, in the in-vehicle electronics of the vehicle or in a remote database. In the latter two cases, care needs to be taken to identify the tire uniquely, for instance using an identification number, so that the stored data can also be assigned uniquely to a tire.

It is particularly advantageous for the measuring system according to the invention if the device for calculating the wheel load acting on the tire, the comparison device and the adaptation device are arranged in a semiconductor chip, and the receiving device constitute at least one input of this chip. Semiconductor chips are small, reliable and easily available. Hence it is advantageous to have the functions according to the invention run in such a semiconductor chip, for instance a microprocessor with memory. It is also possible, however, to integrate the method according to the invention, or respectively the means required for the method, in an in-vehicle electronics system that already exists.

Finally, it is also advantageous if the measuring system also contains at least one sensor for measuring a deformation of a tire. The sensors can also be combined as part of the measuring system. It is highly likely that a distributed measuring system will be employed in this case, in which the sensors are normally arranged in the tire or in a position close to the tire.

Other features which are considered as characteristic for the invention are set forth in the appended claims.

Although the invention is illustrated and described herein as embodied in a method and a measuring system for determining a wheel load, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1A is a diagrammatic side view of a vehicle with a measuring system according to the invention;

FIG. 1B is an illustration of the measuring system for the vehicle;

DETAILED DESCRIPTION OF THE INVENTION

Figure 2:
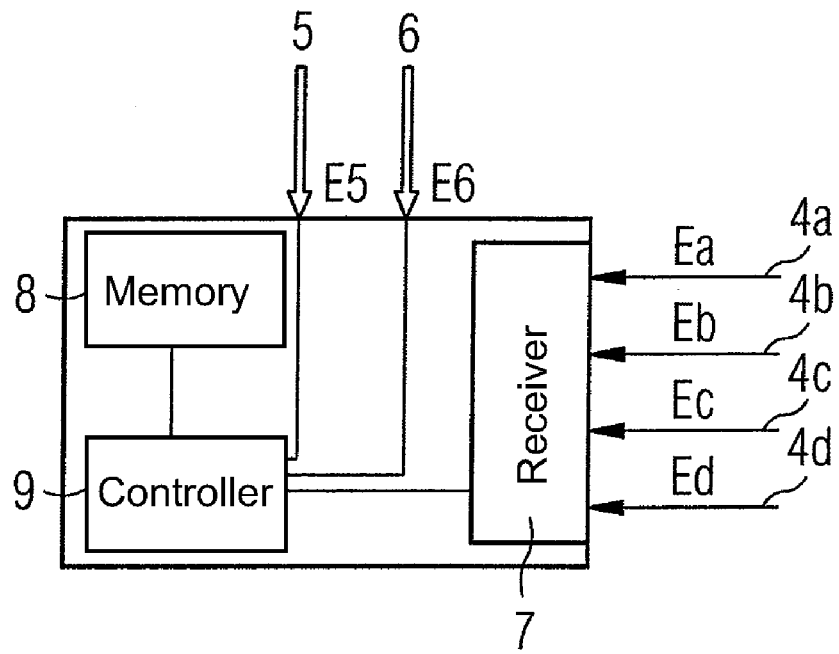
FIG. 2 is a block diagram showing main components of the measuring system.

In the figures of the drawing, the same reference signs are given to identical and functionally identical elements and features unless otherwise specified.

Referring now to the figures of the drawing in detail and first, particularly, to FIGS. 1A and 1B thereof, there is shown a side view and plan view of a vehicle 1. The vehicle 1 has four wheels 2a-2d, each assigned respective wheel-load sensors 4a-4d, a measuring system 3 for determining the wheel load RLa-RLd of at least one wheel 2a-2d, and a sensor for measuring a transverse acceleration 5 and a sensor for measuring a longitudinal acceleration 6. The force vectors of the wheel load RLa-RLd are also shown in FIGS. 1A-1B.

FIG. 2 shows a detailed diagram of the measuring system 3. The measuring system contains a receiver 7 for receiving the radio-transmitted wheel loads RLa-RLd, an input E5 for receiving the transverse acceleration and an input E6 for receiving the longitudinal acceleration. In addition, the measuring system 3 contains a memory 8 and a microcontroller 9. One of the functions of the memory 8 can be to store the equations and equation parameters required for the method according to the invention. Normally, the method is stored in the memory 8 in the form of a program. The microcontroller 9 retrieves the program and executes the method step by step. The measuring system 3 can also contain a transceiver for transmitting and receiving to and from a database (neither shown). The measuring system 3 may also be part of a non-illustrated in-vehicle computer, which also performs other control functions of the vehicle 1. In this case, the connection to a remote database can be made, for instance, via a GSM interface (Global System for Mobile Communications) or UMTS interface (Universal Mobile Telecommunications System) of the vehicle 1. For simplicity's sake, however, it is assumed below that the measuring system 3 is a separate device.

Figure 3:
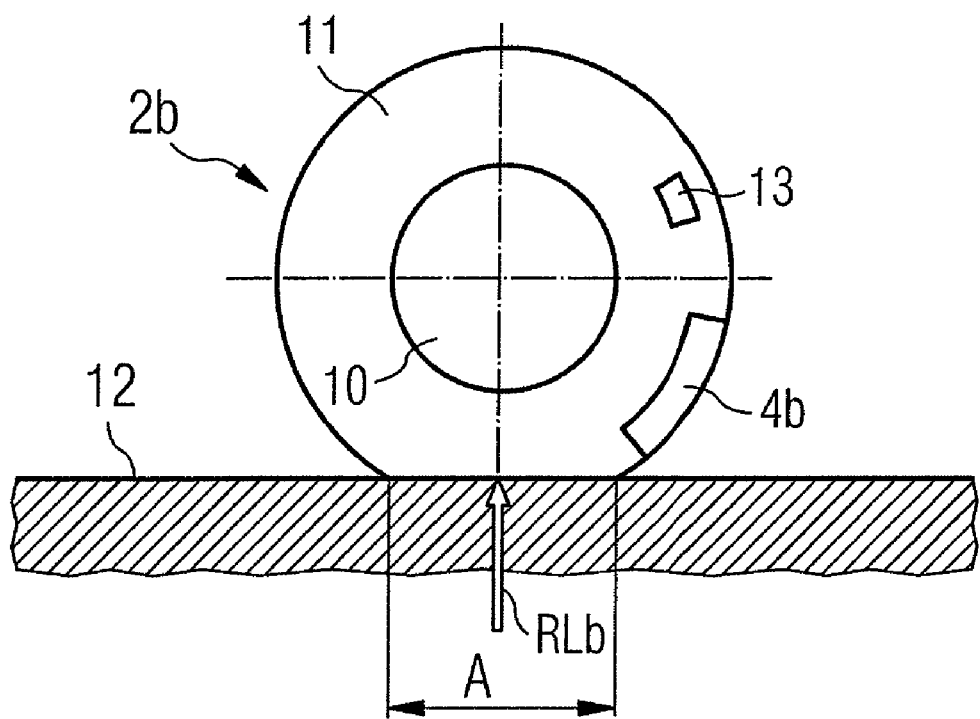
FIG. 3 is an illustration showing a detailed view of a wheel.

FIG. 3 shows the wheel 2b in an enlarged view. The wheel 2b contains a rim 10 and a tire 11. A sensor 4b is arranged in or on the tire 11 in the region of the running surface of the tire 11. The sensor measures the length of the wheel footprint A, which is created by the deformation of the tire 11 as a result of the wheel load RLb applied via the road 12. In addition, a transponder 13 is arranged in the tire 11, which is provided for storing, for example, an identification number, tire type, tire dimension and production date. Furthermore, it is also possible to store equations and equation parameters in the transponder 13. It is assumed in this example that the transponder 13 works in accordance with one of the standards provided for radio frequency identification (RFID).

How the method according to the invention works and respectively how the measuring system 3 works is now explained in greater detail with reference to FIGS. 1A to 3. In response to a request, or at periodic times, the measuring system 3 starts to execute the method according to the invention. For the sake of simplicity, it is assumed that only the wheel load RLb of the wheel 2b is being determined. Obviously, the invention enables all wheel loads RLa-RLd to be determined, both sequentially and in parallel.

In a first step a), a deformation of the tire 11 is measured. For this purpose, for example, the area or length of the wheel footprint A (also referred to by the term "contact patch") is determined. This can be done, for example, using sensors 4b distributed in the tire 11, for instance piezoelectric sensors.

An elegant method for determining the length of the wheel footprint A involves determining the time it takes to pass through this area. An acceleration sensor, for example, can be used to do this, with a centrifugal acceleration not being exerted on this sensor within the wheel footprint A, but being exerted outside this area. If, at a known driving speed, a measurement is then made of the time during which no centrifugal acceleration is exerted on the acceleration sensor, the length of the wheel footprint A can be calculated from this.

Instead of an acceleration sensor, a piezoelectric sensor can also be fitted in the tire 11, this sensor being "bent" on entering and leaving the wheel footprint A and being linear in shape when passing through the wheel footprint A. These deformation patterns can likewise be used to determine the time period that is required to pass through the wheel footprint A, and hence the length of the wheel footprint A.

Obviously, apart from measuring the length of the wheel footprint A, other parameters can also be measured, for instance the deformation of the side wall or the distance between running surface of the tire 11 and rim 10.

In a second step b), the wheel load RLb is calculated from the measured deformation. The deformation of a tire 11 namely depends on the wheel load RLb acting on it. The greater the wheel load RLb, the larger the wheel footprint A and wheel footprint length. Therefore in theory, it is possible to calculate the wheel load RLb from the length of the wheel footprint A.

Apart from the wheel load RLb, however, there are still numerous other influencing factors, some of which can be measured relatively easily, such as the tire pressure and temperature, some of which, however, cannot be measured or only with extremely complicated technology. For instance, the elasticity of the rubber compound depends on the temperature. Although the temperature can itself be measured easily, large temperature differences can exist within the tire 11, for instance if the sun is shining on one side of the tire 11. The elasticity also depends, for example, on the age of the tire 11 and on the conditions under which it has aged.

Because of these uncertainty factors, in a third step c), a wheel load RLb or a variable dependent on this load, which is used to calculate the wheel load RLb, is received from an external system. In the illustrated example, the values are retrieved from the transverse acceleration sensor 5 and the longitudinal acceleration sensor 6 for this purpose. If the weight of the vehicle 1 and the position of the center of gravity are known, the measuring system 3 can now calculate the wheel loads RLa-RLd acting on the wheels 2a-2d. Alternatively, these values can also be stored in a table. In a further embodiment, the longitudinal acceleration and transverse acceleration are not transferred to the measuring system 3 but instead the wheel loads RLa-RLd directly. For instance, these can be calculated in an existing in-vehicle computer and then transferred to the measuring system 3. Of course it is also possible that the measuring system 3 is a component of an in-vehicle computer anyway, i.e. is integrated in this computer. The measuring system 3 can hence be part of the hardware and/or software of an in-vehicle computer.

Alternatively or additionally to this, a control variable of an active shock-absorber system can be measured as the variable dependent on the wheel load RLa-RLd, and the wheel load RLa-RLd can be determined from this. Such data is already available in luxury-class modern vehicles in particular. In a further embodiment of the invention, the suspension compression of a passive shock-absorber system is measured. If the spring constant of the suspension strut is known, then the wheel load RLa-RLd can be calculated from the suspension compression. It is also possible to use for the further method steps the wheel load RLa of a wheel 2a fitted on the same axle. In particular when there is no transverse acceleration, it can be assumed that the wheel loads RLa-RLd are evenly distributed on an axle. Finally, the total weight and position of the center of gravity provide a relatively simple option for determining wheel loads, at least when the vehicle is stationary. It is also possible, however, to use the vehicle's speed and the moment acting on the vehicle 1 as a result of the wind forces and/or to use the steering angle and the associated transverse acceleration to calculate a wheel load RLa-RLd.

In a fourth step d), the wheel load RLb calculated in step b), i.e. using the tire deformation, is compared with the wheel load RLb determined in step c), i.e. using other variables dependent on the wheel load RLb. In the simplest case, a difference or a quotient of the two values is calculated. Other, more complex comparisons are also possible however.

In a fifth step e), equations and/or equation parameters are now adapted on the basis of the results of step d). For this purpose, the equation parameters are modified so as to reduce the difference between the wheel load RLb determined using the tire deformation and the wheel load RLb determined using the external system.

Obviously, the method according to the invention can also run repeatedly under different operating conditions in order to obtain thereby a more precise picture of the differences between the wheel loads RLa-RLd. If it is not sufficient to adapt the parameters of one equation, is also possible to switch to another set of equations that may constitute a better model of reality. In fact there are often different approaches to capturing the real world mathematically. The present invention helps to find the best model.

The equations and/or equation parameters can be adapted particularly quickly when this adaptation starts from a favorable starting point. Hence the equations and/or the equation parameters, or respectively data that enables them to be determined, can be retrieved from the transponder 13 (e.g. RFID transponder) fitted in the tire 11, from a remote database or from another tire 11 of the same type fitted on the same vehicle 1. In the latter case, it is advantageous to use data about a tire 11 on the same axle.

It is also possible and advantageous to store back again the equations and/or equation parameters, or respectively data that enables them to be determined. An example is the removal of a summer/winter tire, which is refitted six months later on the same vehicle 1.

The invention claimed is:

1. A method for determining a wheel load, which comprises the steps:
   a) receiving a measurement of a deformation of a tire resulting in a measured deformation;
   b) calculating the wheel load acting on the tire using the measured deformation and a set of equations and equation parameters;
   c) receiving from an external system one of a further wheel load and a variable dependent on the further wheel load, which is used to calculate the further wheel load;
   d) comparing the wheel load determined in step b) with the further wheel load determined in step c); and
   e) adapting at least one of the set of equations and the equation parameters on a basis of the comparing step.

2. The method according to claim 1, which further comprises selecting the variable dependent on the further wheel load from the group consisting of control variables of: an active shock-absorber system, a suspension compression of a passive shock-absorber system, a longitudinal acceleration, a transverse acceleration, an additional wheel load of a wheel fitted on a same axle, a total vehicle weight and a position of center of gravity, braking data, vehicle speed and a steering angle.

3. The method according to claim 1, which further comprises in an initial step performing one of:
   retrieving at least one of the set of equations and the equation parameters stored in a transponder, the transponder being fitted one of in and on the tire; and
   retrieving data stored in the transponder, the transponder being fitted one of in and on the tire, and determining at least one of the set of equations and the equation parameters from the data retrieved.

4. The method according to claim 1, which further comprises in an initial step performing one of:
   retrieving at least one of the set of equations and the equation parameters, which are stored in a remote database and assigned to one of the tire and tire type; and
   retrieving data stored in the remote database and assigned to one of the tire and tire type, and determining at least one of the set of equations and the equation parameters from the data retrieved.

5. The method according to claim 1, which further comprises transmitting at least one of the set of equations and the equation parameters to a remote database.

6. The method according to claim 1, which further comprises retrieving at least one of the set of equations and the equation parameters in an initial step from another tire of a same type fitted on a same vehicle.

7. The method according to claim 1, which further comprises:
   storing at least one of the set of equations and the equation parameters before removing the tire or a wheel on which the tire is fitted; and
   retrieving again at least one of the set of equations and the equation parameters in an initial step after fitting the tire or the wheel on which the tire is fitted.

8. A measuring system for determining a wheel load, the measuring system comprising:
   a) receiving means for receiving a measurement of a deformation of a tire and outputting a measured deformation;
   b) means for calculating the wheel load acting on the tire using the measured deformation and a set of equations and equation parameters;
   c) means for receiving from an external system one of a further wheel load and a variable dependent on the further wheel load, which is used to calculate the further wheel load;
   d) comparison means for comparing the wheel load that was determined using said means cited in b) with the further wheel load that was determined using said means cited in c); and
   e) adaptation means for adapting at least one of the set of equations and the equation parameters on a basis of a comparison.

9. The measuring system according to claim 8, further comprising a semiconductor chip, said means for calculating the wheel load acting on the tire, said comparison means, and said adaptation means disposed in said semiconductor chip, and said receiving means constituting at least one input of said semiconductor chip.

10. The measuring system according to claim 8, further comprising at least one sensor for measuring a deformation of the tire.

11. The measuring system according to claim 8,
   further comprising an input for receiving from the external system at least one of the further wheel load and the variable dependent on the further wheel load; and
   wherein the variable being at least one variable selected from the group consisting of control variables of: an active shock-absorber system, a suspension compression of a passive shock-absorber system, a longitudinal acceleration, a transverse acceleration, an additional wheel load of a wheel fitted on a same axle, a total vehicle weight and position of center of gravity, braking data, vehicle speed and an steering angle.

12. The measuring system according to claim 8, further comprising:
   a transponder being one of fitted in the tire and on the tire; and
   a reading device for one of:
      retrieving at least one of the set of equations and the equation parameters stored in said transponder; and
      retrieving data stored in said transponder and is suitable for determining
   at least one of the set of equations and the equation parameters.

13. The measuring system according to claim 8, further comprising one of:
   a receiver for receiving at least one of the set of equations and the equation parameters that are stored in a remote database and assigned to the tire or tire type; and
   a receiver for receiving data that is stored in a remote database and assigned to the tire or the tire type, and that is suitable for determining at least one of the set of equations and the equation parameters.

14. The measuring system according to claim 8, further comprising a transmitter for transmitting at least one of the set of equations and the equation parameters to a remote database.

15. The measuring system according to claim 8, further comprising one of:
- means for receiving at least one of the set of equations and the equation parameters from another tire of a same type fitted on a same vehicle; and
- means for receiving data that is assigned to another tire of the same type fitted on the same vehicle and suitable for determining at least one of the set of equations and the equation parameters.

16. The measuring system according to claim 8, further comprising:
- means for storing at least one of the set of equations and the equation parameters before removing the tire or the wheel on which the tire is fitted; and
- means for retrieving at least one of the set of equations and the equation parameters after fitting the tire or the wheel on which the tire is fitted.

* * * * *